United States Patent [19]

Kramer

[11] Patent Number: 4,945,412

[45] Date of Patent: Jul. 31, 1990

[54] METHOD OF AND SYSTEM FOR IDENTIFICATION AND VERIFICATION OF BROADCASTING TELEVISION AND RADIO PROGRAM SEGMENTS

[76] Inventor: Robert A. Kramer, 627 14th St., Santa Monica, Calif. 90402

[21] Appl. No.: 344,064

[22] Filed: Apr. 25, 1989

Related U.S. Application Data

[63] Continuation-in-part of Ser. No. 206,294, Jun. 14, 1988.

[51] Int. Cl.$^5$ .................. H04N 7/08; H04N 7/087
[52] U.S. Cl. .............................. 358/142; 358/147; 455/2
[58] Field of Search ............... 358/84, 86, 142, 143, 358/144, 145, 146, 147, 198; 370/76; 375/91; 455/2, 49, 53, 67

[56] References Cited

U.S. PATENT DOCUMENTS 3,845,391 10/1974 Crosby .............................. 455/45
4,547,804 10/1985 Greenberg ....................... 358/147
4,703,476 10/1987 Howard .

FOREIGN PATENT DOCUMENTS 0281580 12/1987 Japan .
2040129 8/1980 United Kingdom ............... 358/146

Primary Examiner—John W. Shepperd
Assistant Examiner—Michael D. Parker
Attorney, Agent, or Firm—Leonard Bloom

[57] ABSTRACT

A method of and system for identification and verification of TV and/or radio broadcasted program segments involving use of subaudible codes which are mixed with the conventional audio in the program segments. Individual program segments, which may include commercial message segments, have at the beginning thereof a preamble code (such as a predetermined number of cycles of 40 Hz.), a program segment identification code (which may consist of a series of alphanumeric characters) and a postamble code (such as a given number of cycles of 40 Hz.). The program segment codes may consist of a series of mark and space signals (such as presence and absence of 40 Hz. signals). A plurality of radio/television broadcast stations are monitored, the codes recovered and data sets defined, stored and later sent to a central location for reconciliation and/or compilation. In the case of television stations, the video content of at least commercial message segments may be monitored to determine video signal continuity by monitoring the presence and/or absence of video signals of some or all program segments, especially the commercial message segments.

37 Claims, 11 Drawing Sheets

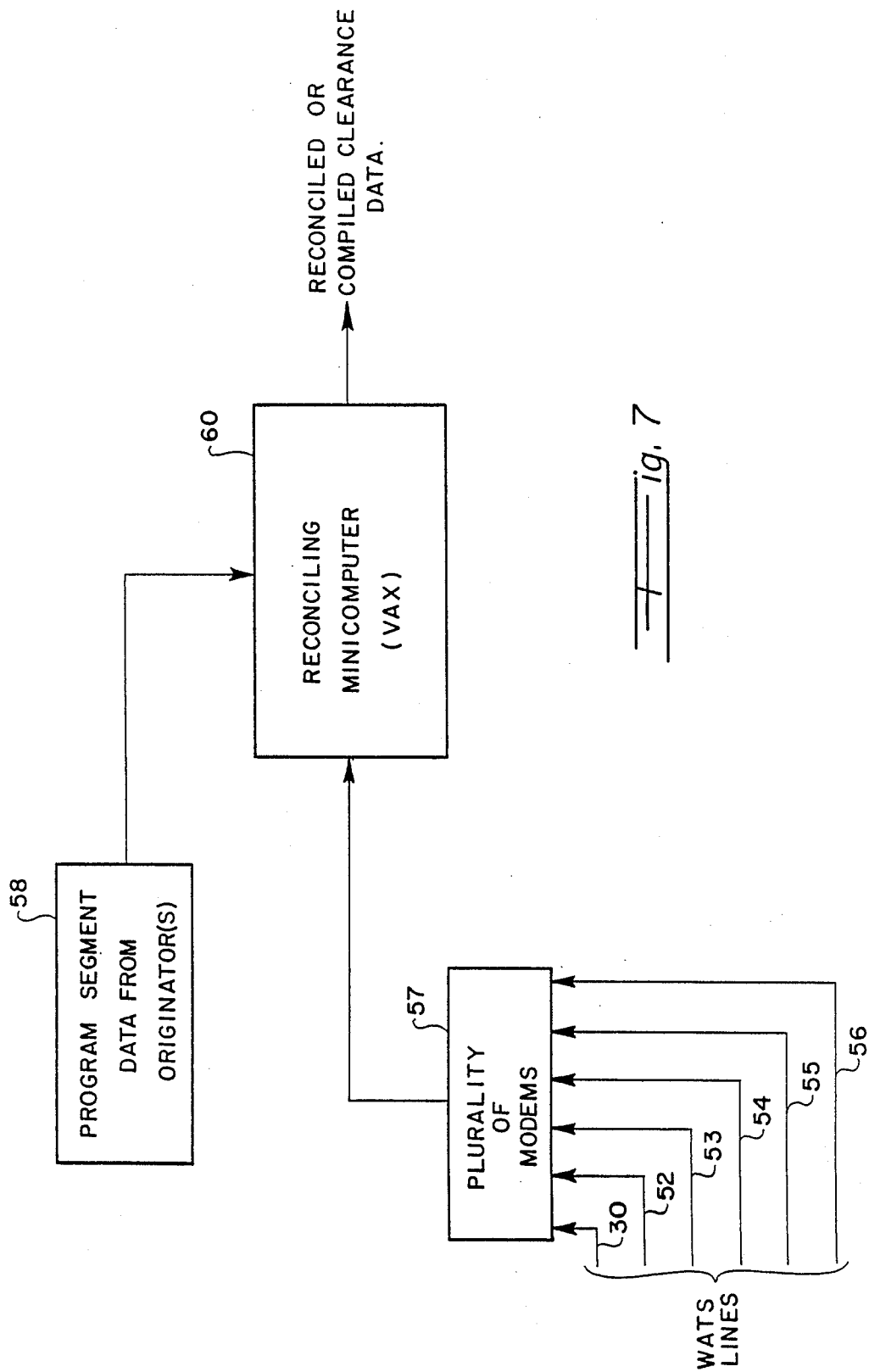

METHOD OF AND SYSTEM FOR IDENTIFICATION AND VERIFICATION OF BROADCASTING TELEVISION AND RADIO PROGRAM SEGMENTS

CROSS REFERENCE TO RELATED APPLICATION

This application is a continuation-in-part of application Ser. No. 206,294 filed June 14, 1988 and entitled "Method of and System for Identification and Verification of Broadcasted Program Segments", the disclosure of which is incorporated herein in its entirety by reference.

BACKGROUND OF THE INVENTION

1. Field of Invention

This invention relates generally to an improved method of and system for automatically identifying and verifying television and radio program segments, including commercial messages, using identification codes. More particularly, the present invention relates to such an improved method and system which do not degrade program quality, are not perceptible to a listener or viewer and are very reliable.

2. Description of the Prior Art

Over the years two general techniques have been developed in program identification systems; these are identification encoding and pattern recognition, but these techniques as thus far developed have been found to be substantially limited and have not been entirely satisfactory.

Program identification coding methods have been divided into two general areas, audio and video encoding. Audio encoding (e.g. U.S. Pat No. 3,845,391 to Crosby) has proven to be unsatisfactory for television broadcasting. In the final report of the Ad Hoc Committee On Television Broadcast Ancillary Signals Of The Joint Committee On Intersociety Coordination (published May, 1978), the Journal Of The Society Of Motion Picture and Television Engineers found the aforementioned audio program identification to be extremely unreliable and caused significant degradation of program signal quality.

Video encoding has also proved to be less than satisfactory for television broadcasting. In U.S. Pat No. 4,025,851 to Haselwood et al. for network clearance monitoring, a 48 character digital code is placed onto the vertical blanking interval of line 20. While the use of line 20 reduced the degradation of the program signal quality, the encoding system used therein is overly complex and inadequate. This system utilizes a changed line format for the handling of the data, which requires complex data processing, encoding, storage and verification. In addition, the system is only able to monitor the broadcast of a single network with an inability to scan more than one channel. Moreover, only a method and system for the identification of the program is disclosed with there being no teaching as to the integration and recording of information as to the program's audio and visual quality.

A process for automatic electronic recognition and identification of programs and commercial advertisements broadcast on television and radio has been proposed in U.S. Pat. No. 3,919,479 to Moon et al., wherein a digitally sampled reference signal segment derived from either the audio or video portion of the original program content to be identified is compared with successive digitally sampled segments of the corresponding audio or video portion of a broadcast signal in a correlation process to produce a correlation function signal. The sampling rates and the time duration of the reference signal segment and the broadcast signal segments are the same. When the signal segments which are compared are the same, the correlation function signal is relatively large and a recognition thereof is achieved when such correlation function signal exceeds a selected threshold level. The compared signal segments may also be obtained as low frequency signals derived from the original reference and broadcast signals by non-linear and envelope formation processing techniques. This example of computerized pattern recognition is very complex and related solely to program content.

None of the above-noted prior attempts to verify the broadcasting of commercial messages have met with wide acceptance, because each requires either changes in operating procedures, purchase of external hardware, or some amount of manual reconciliation.

Radio and television stations earn the bulk of their revenue by broadcasting commercial messages. Some of these messages are for local advertisers, while a variable percentage is derived from so-called national advertisers. It is customary for these national advertisers to employ advertising agencies to create the actual commercials to be aired; these agencies then proceed to buy air time in the desired radio/television markets. Due to the sheer numbers of markets and broadcast outlets (air time is generally purchased on more than one station within a market, and many markets can be specified), the agencies usually make use of firms which represent the individual stations. If a radio or television network is included, the network is contacted, and time is purchased. Thus, a commercial can reach an individual station by one of two routes, via a wired network (such as ABC, NBC or CBS), or through an "un-wired" network, such as one of the national station-representing firms. In both circumstances, it is necessary that the network and the agency have some means of verifying that the commercial(s) were broadcast as specified.

At present, these verifications (affidavits of performance) are generally generated manually, by each radio and television station. The originating network must then collect and reconcile each of these affidavits, also manually. This process is very lengthy and prone to error. Only after the affidavits are reconciled can payment to the networks and stations be made. The average lead time for payment to a local television or radio station, broadcasting a nationally-originated commercial, is four-to-six months. Most of this delay is directly attributable to the manual processing involved, and virtually all station and network personnel, for a variety of reasons, are desirous of a faster, more reliable, automated means of verifying broadcasts.

SUMMARY OF THE INVENTION

An object of the present invention is to provide a novel and improved method of and system for automatic television and radio broadcast program segment identification and verification.

Another object is to provide a novel and improved method of and system for automatic television and radio broadcast program segment identification and verification that does not degrade the broadcast content.

A further object is to provide a novel and improved method of and system for automatic television broadcast program segment identification and verification that can monitor one or more channels at a time.

An additional object is to provide a novel and improved method of and system for automatic television broadcast program segment identification and verification wherein the program data generates subsequent data which is stored locally and later sent to a central evaluation center.

Yet another object is to provide a method of and system for automatic television and radio broadcast program segment identification and verification which does not require any modification of standard broadcasting studio and/or transmitting equipment.

Yet a further object of the present invention is to provide a method of and a system for automatic television and radio broadcast program segment identification and verification which is both simple and reliable.

Yet an additional object of the present invention is to provide a method of and system for automatic television and broadcast commercial message identification and verification.

Still another object of the present invention is to provide a method of and a system for automatic television and radio broadcast commercial message identification and verification which produces data indicative of audio and/or video interruptions of identified commercial messages.

An improved method of and a system for identification and verification of radio and television transmitted program and commercial materials are provided in accordance with the present invention. Assurance of proper airing of these materials is achieved through an encoded subaudible message received by the system described herein, and transmission to a central reconciliation point of these encoded messages for the purpose of generating proof-of-performance affidavits. The present invention utilizes a unique program identification code, which is recorded in the main audio channel. This code is intended for recording on a master tape of the program or commercial, and subsequent duplications of this master tape would likewise contain the identification code. Radio and television stations broadcasting the tape need add no hardware, nor make any changes whatsoever in their operating procedures. A code receiving device, which monitors all radio and television stations in a given market area, is, in effect, a multi-channel receiver, programmed to filter out all material except the transmitted subaudible codes based on a single frequency subaudible tone. In this manner, the receiving device identifies the transmitting radio and television stations, the code (and thus the particular program segment, such as a commercial message) and, in effect, stamps this data with the time and date, and, if desired, a signal which indicates whether or not the individual program segments, including individual commercial messages, was broadcasted in its entirety. Thus, it is possible to monitor an entire market's broadcast facilities (radio and television, including cable sources). At a given time each day, the monitoring receiving station transmits all received codes (along with the identifying data), through a modem, to a central reconciliation location. The central reconciliation location may include a computer which compares the data received data with information supplied at the time the original program encoding occurred. In this manner, affidavits proving performance (necessary for payment of advertising charges for networks and individual stations) can be generated on a market-by-market basis, along with such statistical data regarding these broadcast programs as may be deemed desirable.

From one vantage point, the invention can be seen as a system for identification and verification of broadcasted program segments, which includes a plurality of broadcasting stations, at least one being a television broadcasting station. The stations broadcast signals which include program segments having a subaudible preamble code, respective subaudible program segment identification codes, following each preamble code occurrence, a subaudible postamble code following each program segment identification code occurrence and, in the case of television broadcast stations a video signal. At least one monitoring station receives the broadcasted signals, the monitoring station including (a) means for generating date-indicating and time-indicating signals, (b) respective channels responsive to the broadcasted signal from each respective broadcasting station for recovering each received preamble code, each received respective program segment identification code, each received postamble code and, for monitored television broadcast stations, each video signal to develop therefrom video presence and/or absence signals during periods between each received preamble code and each received postamble code, and (c) means for providing respective broadcast station-identification signals. Means at the monitoring station store data signal representations of each occurrences of the recovered preamble code, the recovered respective program segment identification codes, the recovered postamble code, the developed video presence and/or absence signals, the date-indicating and time-indicating signals, and the station-identifying signals for each channel. Means at the monitoring station send the stored data signal representations to a central station, the central station being provided with means for receiving data from a plurality of monitoring station to compile and/or to reconcile same.

The invention can be seen as being in a system for identification and verification of broadcasted program segments from a plurality of broadcasting stations, including at least one television broadcasting station. At least one monitoring station receives broadcasted signals from the broadcasting stations. The monitoring station includes (a) means for generating date-indicating and time-indicating signals, (b) respective channels responsive to respective broadcasted signals from respective broadcasting stations for recovering a subaudible preamble code, respective subaudible program segment identification codes, a subaudible postamble code, and, for monitored television broadcast stations, each video signal to develop therefrom video presence and/or absence signals at least during periods between each received preamble code and each received postamble code, and (c) means for providing respective broadcast station-identification signals. Means at the monitoring station store data signal representations of each occurrence of the recovered preamble code, the recovered respective program identification codes and the postamble code, the video presence and/or absence signals, the date-indicating and time-indicating signals and the station-identifying signals for each channel. Means at the monitoring station send the stored data signal representations to a central station, the station being provided with means for receiving data from a plurality of monitoring stations to compile and/or to reconcile same.

The invention can be seen as being in a system for identification and verification of broadcasted program segments from a plurality of broadcasting stations, including at least one television broadcast station. At least one monitoring station receives broadcasted signals from the broadcasting stations, the monitoring station including (a) means for generating date-indicating and time-indicating signals, (b) respective channels responsive to respective broadcasted signals from respective broadcasting stations for recovering a subaudible preamble code, respective subaudible program segment identification codes of each program segment received therefrom and a subaudible postamble code and, for monitored television broadcast stations each video signal to develop therefrom video presence and/or absence signals at least during periods between each received preamble code and each received postamble code, and (c) means for providing respective broadcast station-identification signals. Means at the monitoring station store signal representations of each occurrence of the recovered preamble code, the recovered program segment, the postamble code, identification codes, the video presence and/or absence signals, the date-indicating and time-indicating signals, and the station-identifying signals for each channel.

From a slightly different viewpoint, the invention can be seen as being in a system for identification and verification of broadcasted program segments from a plurality of broadcasting stations, including at least one television broadcasting station. At least one monitoring station receives broadcasted signals from broadcasting stations. The monitoring station has (a) means for generating date-indicating and time-indicating signals, (b) respective channels responsive to respective broadcasted signals from respective broadcasting stations for recovering program segment identification codes consisting of respective series of alphanumeric characters therefrom and, in the case of television broadcast stations, video presence and/or absence signals, and (c) means for providing respective broadcast station-identification signals. Means at the monitoring station store data signal representations of occurrences of the recovered program segment identification codes, the date-indicating and time-indicating signals, the video presence and/or absence signals, and the station-identifying signals for each channel.

The invention also can be seen as being in a system for identification and verification of broadcasted program segments from a plurality of broadcasting stations, at least one of which is a television broadcast station. At least one monitoring station receives broadcasted signals from said broadcasting stations. The monitoring station is provided with (a) means for generating date-indicating and time-indicating signals, (b) respective channels responsive to respective broadcasted signals from respective broadcasting stations for recovering program segment identification codes therefrom consisting of respective series of alphanumeric characters and, in the case of television broadcast stations, developing video presence and/or absence signals, each of the respective series of alphanumeric characters consisting of a respective series of four letters and four numerals, and (c) means for providing respective broadcast station-identification signals. Means at the monitoring station store data signal representations of occurrences of the recovered program segment identification codes, the developed video presence and/or absence signals, the date-indicating and time-indicating signals, and the station-identifying signals for each channel.

The invention can also be viewed as being in a system for identification and verification of broadcasted program segments from a plurality of broadcasting stations, at least one of which is a television broadcast station. At least one monitoring station receives broadcasted signals from the broadcasting stations. The monitoring station has (a) means for generating date-indicating and time-indicating signals, (b) respective channels responsive to respective broadcasted signals from respective broadcasting stations for recovering a preamble code, program segment identification codes and a postamble code therefrom, respective said program segment identification codes being repeated during periods of time between the preamble code and the postamble code whereby it may be determined if the respective program segments have been transmitted in the entirety, and, in the case of television broadcast stations, developing video presence and/or absence signals and (c) means for providing respective broadcast station-identification signals. Means at the monitoring station store data signal representations of occurrences of the recovered program segment identification codes, the developed video presence and/or absence signals, the date-indicating and time-indicating signals, and the station-identifying signals for each channel.

From a somewhat different viewpoint, the invention can be seen as being in a system for identification and verification of broadcasted program segments, at least some of the program segments being commercial message segments, from a plurality of broadcasting stations, including at least one television broadcast station. At least one monitoring station receives broadcasted signals from the broadcasting stations. The monitoring station is provided with (a) means for generating date-indicating and time-indicating signals, (b) respective channels responsive to respective broadcasted signals from respective broadcasting stations for recovering program segment identification codes therefrom, and, in the case of television broadcast signals, video presence and/or absence signals, and (c) means for providing respective broadcast station-identification signals. Means at the monitoring station store data signal representations of occurrences of the recovered program segment identification codes, the date-indicating and time-indicating signals, the video presence and/or absence signals, and the station-identifying signals for each channel.

The plurality of broadcasting stations may include television stations and standard radio broadcasting stations. The audio and/or video components of program segments, particularly commercial segments are checked for continuity.

The standard radio broadcasting stations may include frequency modulation broadcast stations and amplitude modulation broadcast stations.

Some or all of the broadcast stations may be cable channels of a distribution system.

The subaudible program segment identification codes may consist of respective series of alphanumeric characters. The characters in a code may consist of four letters and four numerals. The alphanumeric characters are formed by a series of mark signals and space signals, defined respectively by presence and absence of a 40 Hz. subaudible signal.

The subaudible preamble code may consist of a predetermined number of cycles of 40 Hz. signal and the subaudible postamble code consists of a given number of cycles of 40 Hz. signal.

In the event one wishes to check whether or not any given program segment was transmitted in its entirety, the respective program segment identified code is positioned immediately after the preamble code and is repeated a sufficient number of times.

In its method aspect, the invention can be seen as a method of identification and verification of broadcasted program segments from radio and television stations. The method includes providing program segments having a subaudible preamble code, respective subaudible program segment identification codes and a subaudible postamble code; and broadcasting the program segments from a plurality of broadcast stations, at least one of which is a television broadcast station. The method provides for receiving at a monitoring location broadcasted signals, including the program segments, from the plurality of broadcast stations; and deriving from the received broadcast signals the preamble code, the respective program segment identification codes and the postamble code and, in the case of broadcast signals from television broadcast stations, video presence and/or absence signals. Additional steps include providing at the monitoring location respective broadcast station identification signals, generating at the monitoring location respective date-indicating and time-indicating signals, and storing at the monitoring location signals representing occurrences of the preamble code, the respective program segment identification codes, the postamble code when received and the video presence and/or absence signals, each broadcast station identification signal from which each program segment was received each time it is received therefrom and the date-indicating and time-indicating signals each time a program segment is received and absence of video presence signals during periods between the respective preamble codes and respective postamble codes. The method provides for sending the stored signals as data to a central point which also receives data from other monitoring locations for compilation and/or reconciliation.

The invention also is seen as a method of identification and verification of broadcasted program segments which involves providing program segments having a subaudible preamble code, respective subaudible program segment identification codes and a subaudible postamble code; receiving at a monitoring location broadcasted signals, including the program segments, from a plurality of broadcast stations, including at least one television broadcast station; and deriving from the received broadcast signals the preamble code, the respective program segment identification codes, the postamble code and, in the case of signals from television broadcast stations, video presence and/or absence signals during periods between the respective preamble codes and respective postamble codes. The method includes providing at the monitoring location respective broadcast station identification signals; generating at the monitoring location respective date-indicating and time-indicating signals; and storing at the monitoring location signals representing occurrences of the recovered preamble code, the respective program segment identification codes and the postamble code, when received, the video presence and/or absence signals, each broadcast station identification signal from which each program segment was received each time it is received therefrom and the date-indicating and time-indicating signals each time a program segment is received. The method provides for sending the stored signals as data to a central point which also receives data from other monitoring locations for compilation and/or reconciliation.

The invention can be viewed as a method of identification and verification of broadcasted program segments which includes providing program segments having a subaudible preamble code, respective subaudible program segment identification codes and a subaudible postamble code; receiving at a monitoring location broadcasted signals, including the program segments, from the plurality of broadcast stations, including at least one television broadcast station; and deriving from the received broadcast signals the preamble code, the respective program segment identification codes, the postamble code and, in the case of signals from television broadcast stations, video presence and/or absence signals at least during periods between occurrences of the preamble code and the postamble code. The method further includes providing at the monitoring station respective broadcast station identification signals; generating at the monitoring location respective date-indicating and time-indicating signals; and storing at the monitoring location data signals representing occurrences of the preamble code, the respective program segment identification codes, the postamble code when received and, in the case of video, the video presence and/or absence signals, each broadcast station identification signal from which each program segment was received each time it is received therefrom and the date-indicating and time-indicating signals each time a program segment containing a commercial message is received.

Also in its method aspect, the invention is a method of identification and verification of broadcasted program segments which involves providing program segments having respective subaudible program segment identification codes; receiving at a monitoring location broadcasted signals, including the program segments, from the plurality of broadcast stations, including at least one television broadcast station; and deriving from the received broadcast signals the respective program segment identification codes, the postamble code and the video presence and/or absence signals; and providing at the monitoring station respective broadcast station identification signals. The invention provides for generating at the monitoring location respective date-indicating and time-indicating signals; and storing at the monitoring location data signals representing occurrences of the respective program segment identification codes when received and video presence and/or absence signals, each broadcast station identification signal from which each program segment was received each time it is received therefrom and the date-indicating and time-indicating signals each time a program segment is received.

In some cases the preamble and postamble codes need not be broadcasted in the event one wants to determine only if the program segment was broadcasted without regard to whether or not it was broadcasted in its entirety.

As with the system, in practicing the method, the radio and/or television program segments may include or consist solely of commercial message program segments.

It is also desirable in practicing the method to provide the program segment identification code during the entire time period between the preamble and postamble codes so that one can determine if any breaks occurred in the program segment; that is, audio and/or video components of the segments. This is especially desirable when the program segment involved is a commercial message segment.

BRIEF DESCRIPTION OF THE DRAWINGS

FIG. 7 is a simplified block diagram of an exemplary embodiment of a data center at which data from a plurality of receiving stations can be gathered, completed and/or reconciled.

DETAILED DESCRIPTION OF THE PREFERRED EMBODIMENTS

Figure 1A:
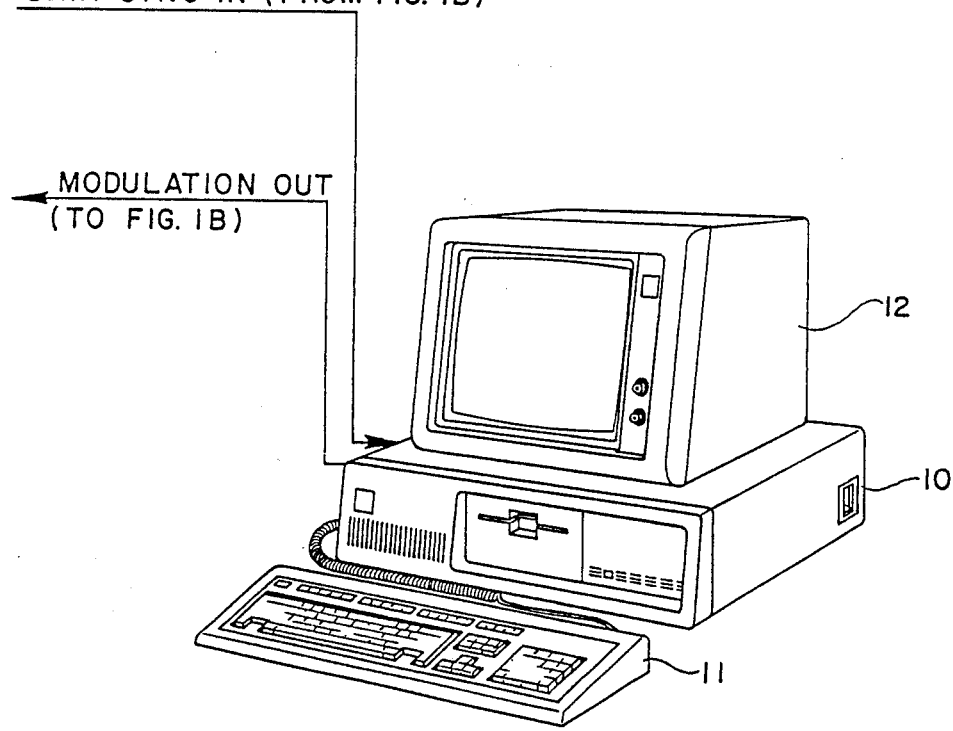
FIGS. 1A and 1B constitute a schematic diagram of an exemplary embodiment of a circuit for encoding program segments, including commercial messages, which is particularly useful in practicing the present invention in both its system and method aspects.
Figure 1B:
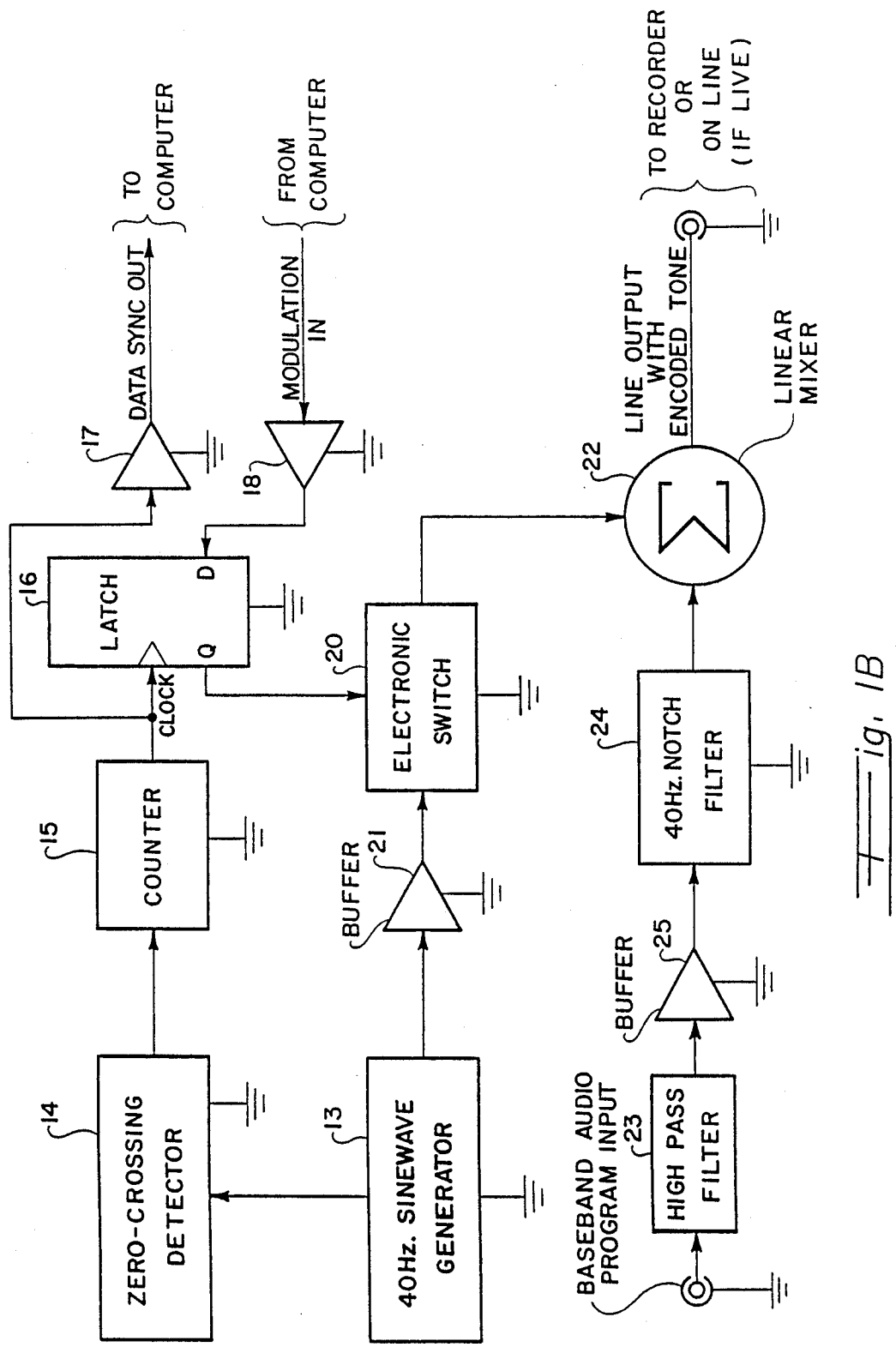

The exemplary circuit for encoding program segments, including commercial messages, in accordance with a realized version of the present invention, as shown in FIGS. 1A and 1B include a programmed computer 10, which may be an IBM-PC-XT TM provided with a hard disk drive and one floppy disk drive, as illustrated. The circuit is provided with a conventional keyboard 11 and a conventional monochrome monitor 12, these three components being connected together by conventional cables (not shown).

The exemplary circuit includes a highly stable 40 Hz. sinewave generator 13 supplying its 40 Hz. output to a zero-crossing detector 14 which produces an output signal each time the 40 Hz. input signal received from the generator 13 passes through zero. The output from the zero-crossing detector is fed to a counter 15, which produces an output pulse train having a pulse repetition rate of 40 pulses per second, this pulse train being fed to the clock input terminal of a latch 16 which, in a realized embodiment was constituted by a commercially available semiconductor chip sold under the designation 74HC74.

Figure 2:
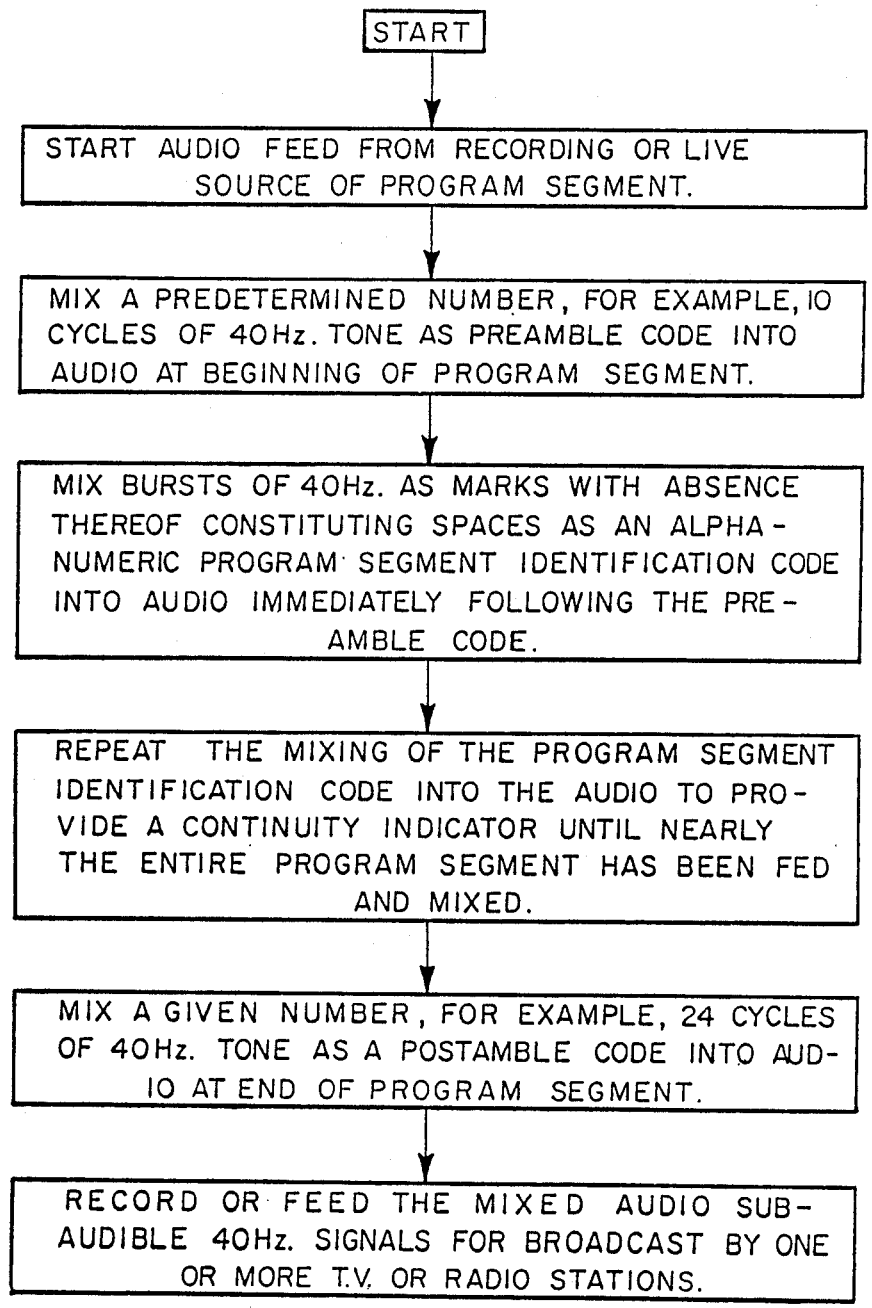
FIG. 2 is a flowchart helpful in understanding the operation of the circuit illustrated in FIGS. 1A and 1B.

The output pulse train from the counter 15 is also fed, as a data synchronization signal, to the computer 10 via a buffer 17. Thus, the computer 10 can be operated in synchronism with the 40 Hz generator 13 and supply its output, labeled "modulation in" to the data terminal (D) of the latch 16 via a buffer 18. The output terminal (Q) of the latch 16 is connected to the control input terminal of an electronic switch 20 which receives a constant 40 Hz. input, at its signal input terminal, from the 40 Hz. generator 13, via a buffer 21. In operation, the electronic switch 20 passes controlled bursts of 40 Hz. signals to a linear mixer 22, under control of the computer 10. The computer 10, in the exemplary realized embodiment, was programmed, using assembly and C languages as set out in the section labeled "Programs" hereinbelow. It is to be understood that other programs may be used to achieve the same ends and in FIG. 2 so that the 40 Hz. signals are selectively passed to mixer 22 as required.

A baseband audio signal, from a live source or from playback of one or more previously recorded program segments is fed via a conventional input connection to a high pass filter 23, which passes signals above 116 Hz. The output from the high pass filter 23 is fed to a 40 Hz. notch filter 24, via a buffer 25. The action of the filters 23 and 24, acting together result in any 40 Hz. signal which appears in the baseband audio being 30 d.b. below other signal components. Thus, any 40 Hz. signals which are passed, via the electronic switch 20, to the linear mixer 22 are virtually free of possible interference from signals of 40 Hz. which may be in conventional audio feeds.

The output from the linear mixer 22 appears as a line output, with encoded 40 Hz.-based signals thereon. This mixed output is preferably rerecorded for distribution to a network (wired or unwired) and/or individual selected broadcast stations for later broadcast. Alternatively, the line output with the encoded 40 Hz. signals could be fed live to distribution lines for either immediate broadcast or remote recording for later broadcast.

Figure 3:
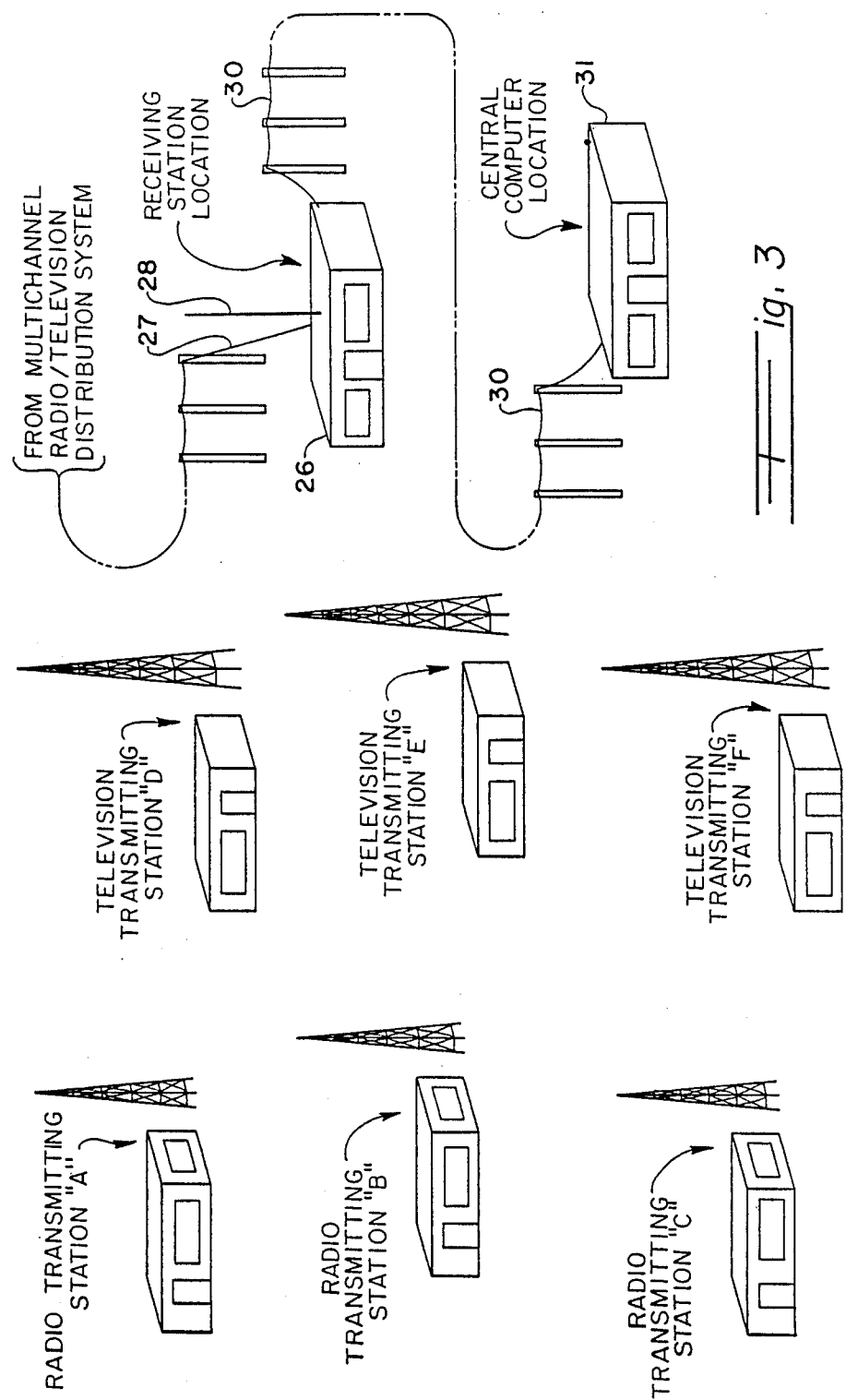
FIG. 3 is a somewhat diagrammatic, pictorial view exemplifying the geographic relationship among broadcast stations, including cable stations, a multichannel receiving station and a central computer location helpful in understanding the present invention, in both its system and method aspects.
Figure 4:
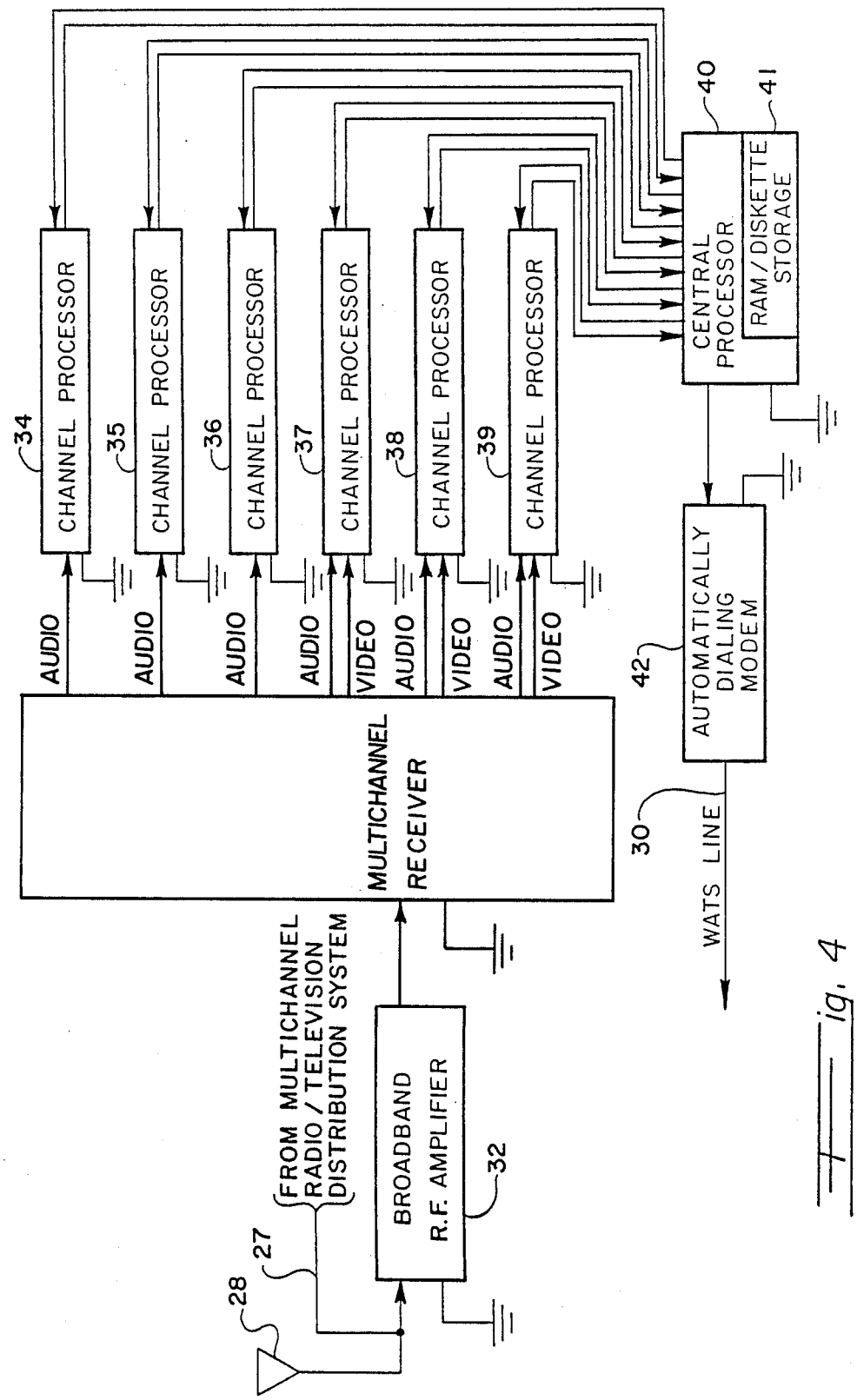
FIG. 4 is a simplified block diagram of an exemplary multichannel receiving station involving reception of both radio and television broadcasts and which may be used in practicing the present invention in its system and method aspects.

Once the program segments, which may include both commercial messages and entertainment segments, have been modified and/or produced using the circuit of FIGS. 1A and 1B, the thus modified program segments having the codes thereon are broadcasted one or more times from one or more television and/or radio stations in various markets throughout the country. In most instances, different encoded program segments may be broadcasted in a given geographic market area, shown diagrammatically in FIG. 3, during the same time period from different broadcast stations. As shown in FIG. 3, by way of example, the market area includes a plurality of radio transmitting stations, three such stations "A", "B" and "C" being shown in FIG. 3; these stations may be FM or AM stations or any other type of radio transmitting stations authorized to broadcast within the particular political national state or political subdivision involved in any case. The market area also includes a plurality of television transmitting stations, three such stations "D", "E" and "F" being shown in FIG. 3 by way of example; these stations may be VHF or UHF stations, or any other type of television transmitting station allowed to broadcast within the particular political national state or political subdivision involved, in any case. The market area may also include one or more multichannel radio/television distribution systems, including local channels, now familiar in cable systems which involve locally produced and/or satellite transmissions. In FIG. 3, one such system is shown as being wired to a program monitoring receiving station 26, via a pole-supported service, illustrated as a coaxial cable 27. As a simplified illustration, a broad band receiving antenna 28 is shown as a means for receiving transmissions from the radio transmitting stations "A"-"C" and television transmitting stations "D"-"F". If desired a parabolic receiving structure could also be provided for receiving other broadcasted signals, such as those from a satellite broadcast service. The receiving station 26, which is illustrated schematically in detail in FIG. 4, is provided with a WATS line 30, or a similar communication arrangement, whereby data from the receiving station may be fed to a central computer location 31, at which location additional data from a plurality of other receiving stations is also received and compiled and/or reconciled with program segment data from the originator(s). Thus, it may be determined, for a multiple market area, whether or not particular program segments—including commercial messages—have been actually broadcasted as intended and whether or not the individual segments have been broadcasted in the entirety.

Figure 5A:
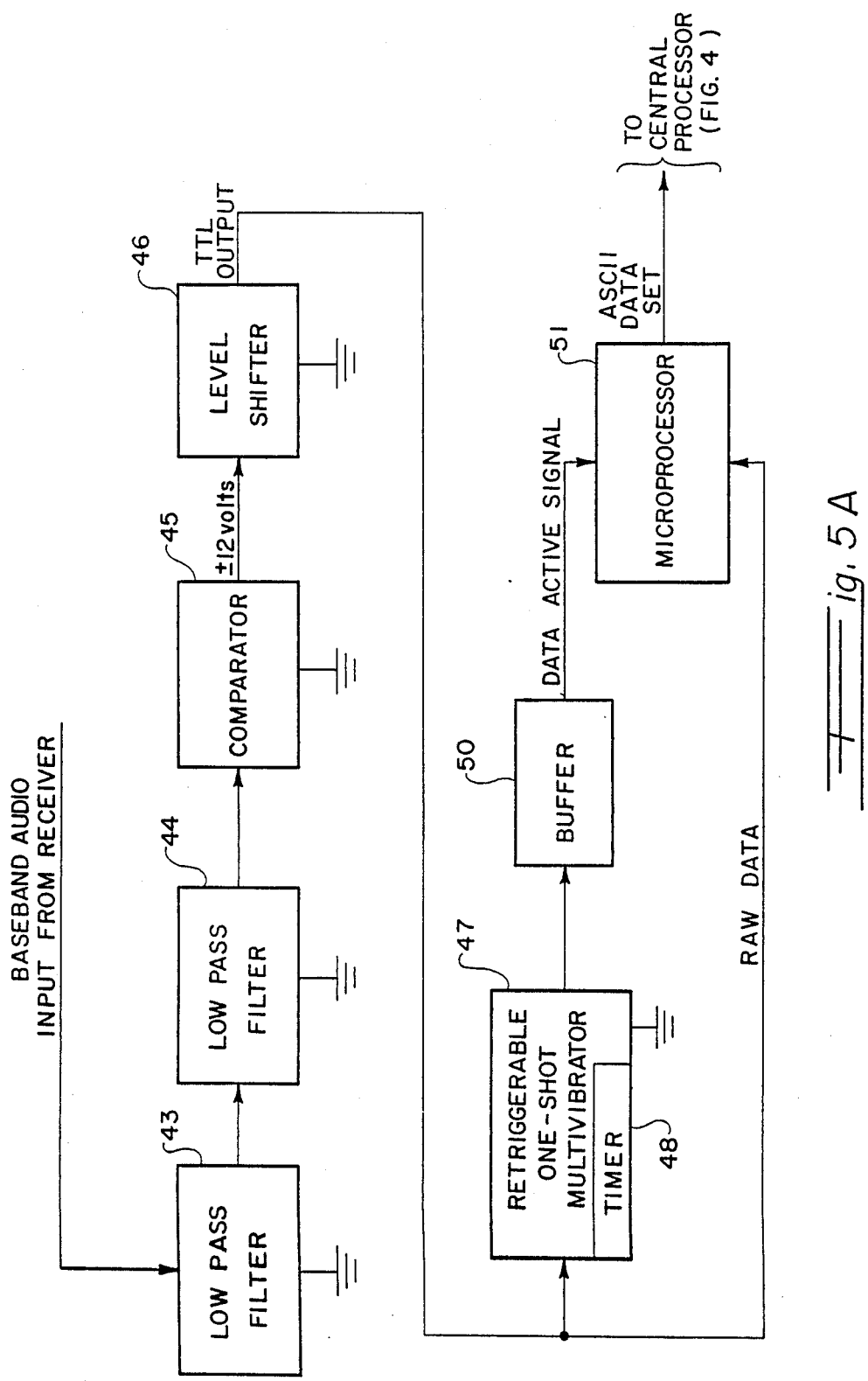
FIG. 5A is an exemplary embodiment of a signal processing channel, a plurality of which may be used for the channels in the receiving station illustrated in FIG. 4.

Turning to FIG. 4, which illustrates circuit details of the circuitry of the receiving station 26 (FIG. 3), the circuitry includes the broadband antenna 28 and a coaxial cable 27 from the cable distribution network. The output from the antenna 28 and the coaxial cable 27 are fed to a broadband R.F. amplifier 32 having its output connected to a multichannel receiver 33 which is provided with a conventional receiver channel for each of the radio and television broadcasting channels which are to be monitored. A respective channel processor 34-39 is coupled to the respective receiver channels in the multichannel receiver 33, one receiver channel and one receiver channel processor being provided for each radio and television broadcast station to be monitored. Six processing channels are shown for purposes of illustration, the channel processors 34-36 being provided for monitoring radio broadcast stations. The channel processors 37-39 are provided for monitoring television stations to check both audio and video signal continuity during selected program segments, in particular those containing commercial messages. In many cases, an installation could involve many more radio and/or television channels, even hundreds. The circuit details of an exemplary channel processor, which may be used for the individual channel processors, is illustrated in FIG. 5A to which more detailed reference is to be made hereinbelow. Reference is also to be made to the circuit shown in FIG. 5B, the circuit including components which monitor and detect video presence and absence during program segments, in particular commercial message segments.

Returning to FIG. 4, the circuitry within the receiving station 26 (FIG. 3) also includes a central processor 40 having a RAM/diskette storage 41, each of the channel processors 34-39 being controlled by the central processor and feeding, under control of the central processor, data sets relating to the encoded program segments as derived by the channel processors to the central processor. As illustrated, channel processors 34-36 receive respective audio inputs from the radio receiving channels of the receiver 33. The central processor 40 is operatively arranged to feed the data sets stored in its RAM (or retrieved from its diskette storage) to an automatically dialing modem 42 on a programmed basis, for example at a particular time after midnight each day, the data sets being fed to the WATS line 30 and, thence, to the central computer location 31. It is to be appreciated that each of the respective channel processors 34-39 is transmitting-station specific and, thus, can operate to automatically tag each received transmitting station identification. The individual channels 34-39 are also provided with date and time signal from a DOS clock within the central processor and arranges to place a date and time stamp at the end of each data set received.

Figure 5B:
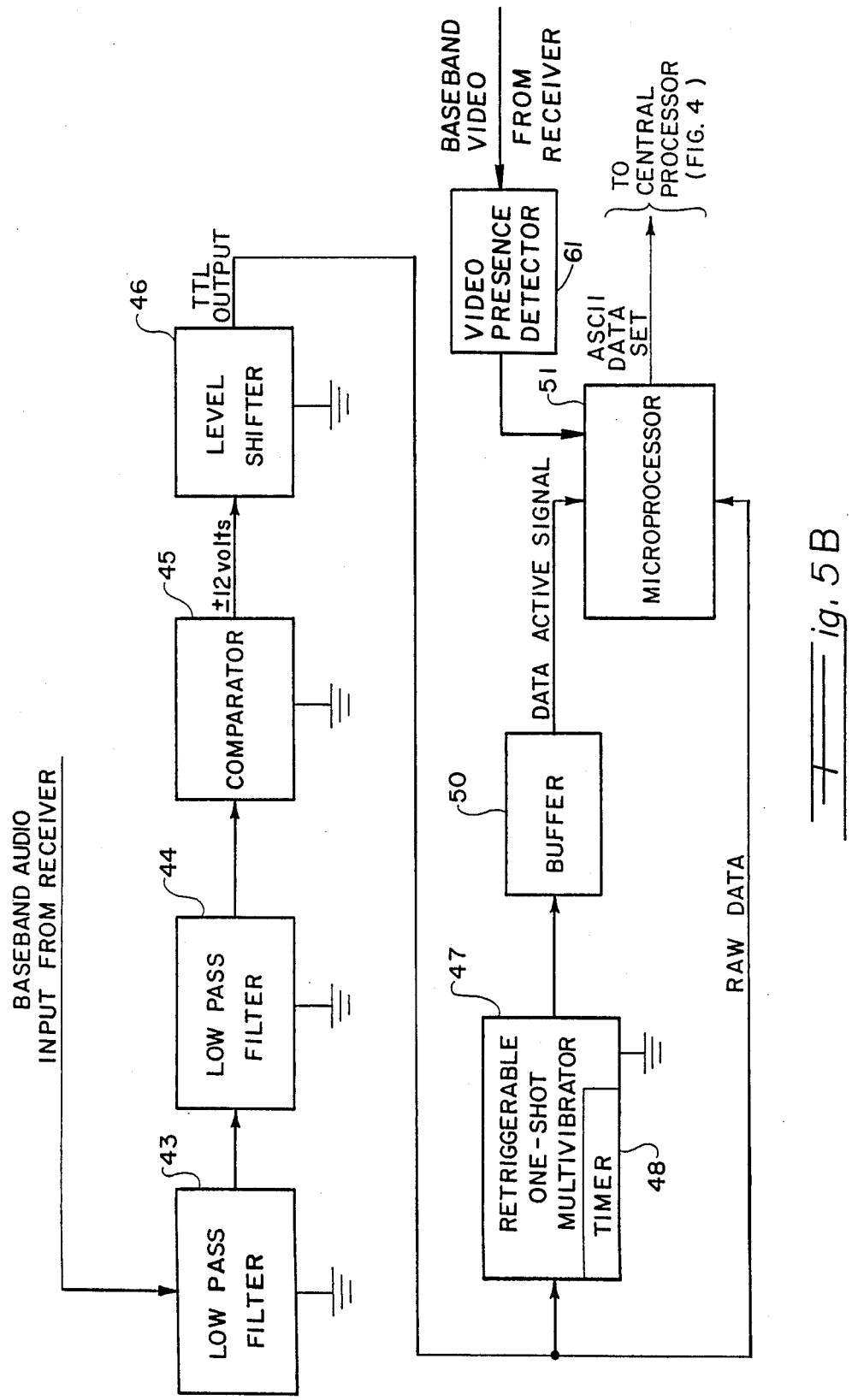
FIG. 5B is an exemplary embodiment of a signal processing channel, one or more of which may be used for one or more channels in the receiving station illustrated in FIG. 4, in those cases in which the continuity of the video portion of the program segments, in particular, segments constituting commercial messages are received.
Figure 6A:
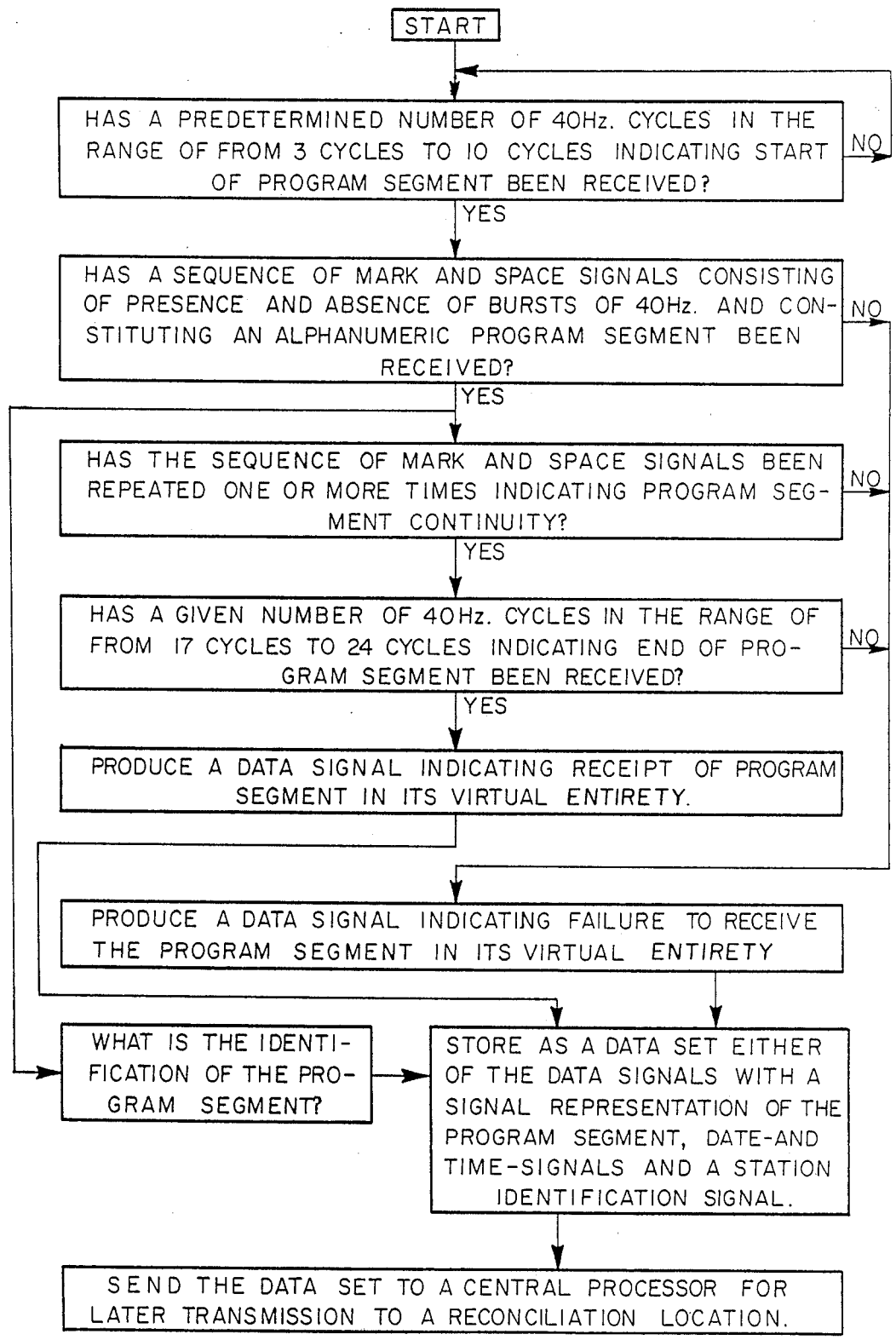
FIG. 6A is a flowchart helpful in understanding the operation of the microprocessor forming part of the circuit shown in FIG. 5A.
Figure 6B:
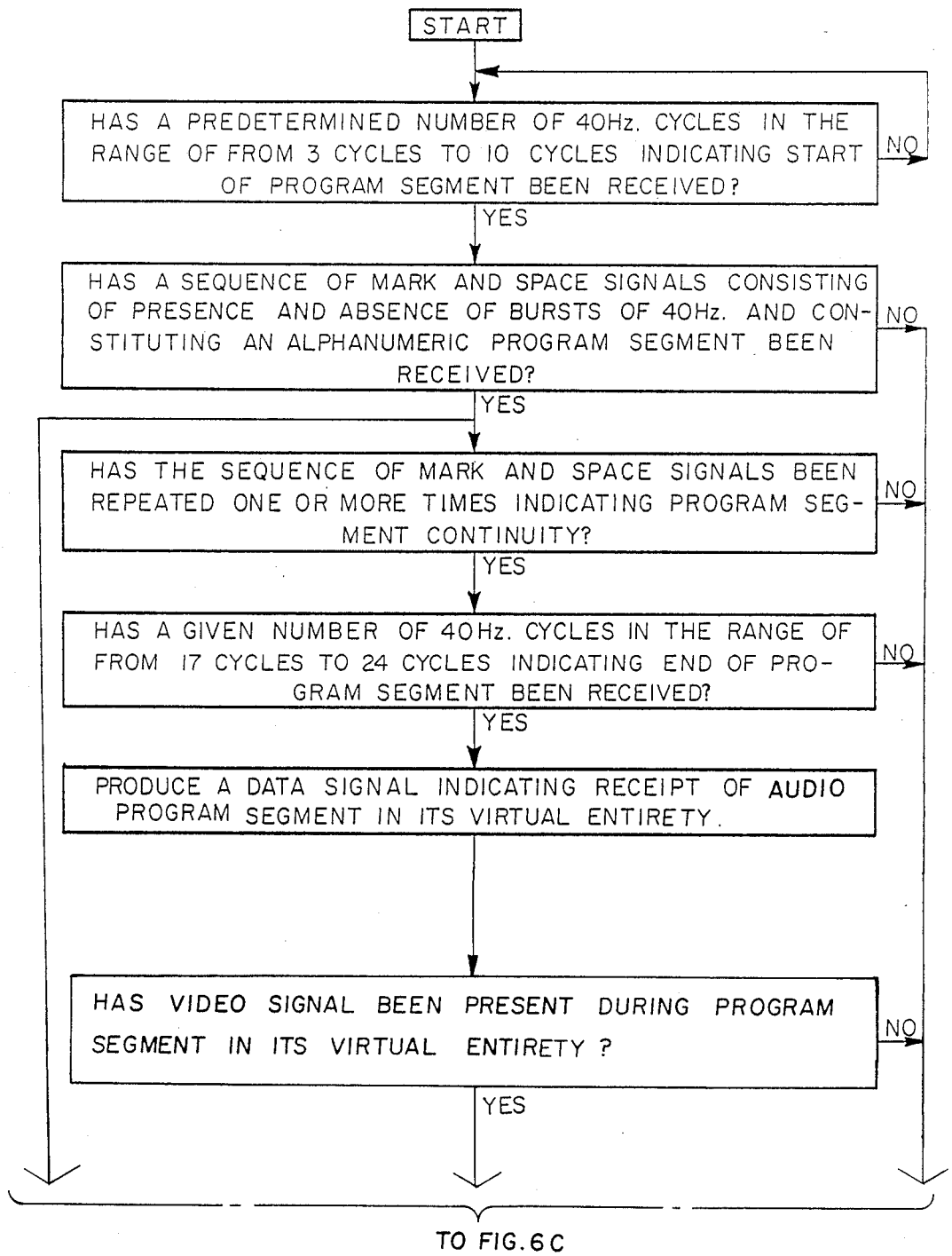
FIGS. 6B and 6C taken together constitute a flowchart helpful in understanding the operation of the microprocessor forming part of the circuit shown in FIG. 5B.
Figure 6C:
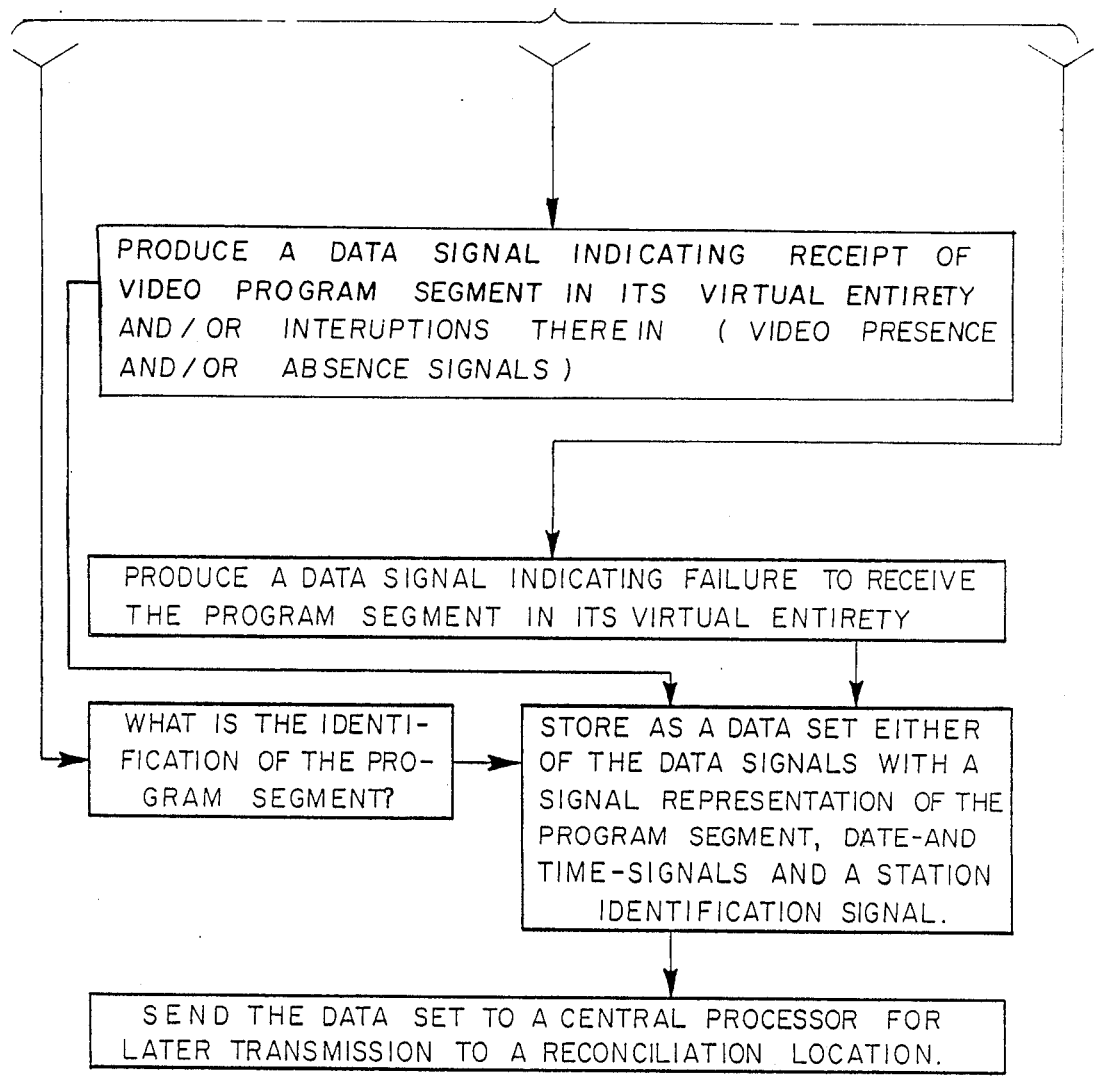

The channel processors 34-36 (FIG. 4) are respectively constructed as illustrated in FIG. 5A, the baseband audio output from a respective one of the channels 34-36 of the multichannel receiver 33 (FIG. 4) being fed to a 10 KHz. low pass pre-filter 43 of the fifth order providing filtering at 3 d.b. per octive. The filter 43, in the case of FM stereo and/or TV effects the removal of subcarrier artifacts. The output from the filter 43 is fed to a low pass filter 44 of a modified five-pole Butterworth type having corners set at 155 Hz. The output of the low pass filter 44 is fed to a comparator 45 which compares the input signal with a reference voltage providing as its output ±12 volts depending on whether or not a 40 Hz. component is present or is not present in the signal received from a respective one of the receiver channels. A level shifter 46, which receives the output from the comparator 45, converts the signal into a conventional TTL output, a +5 volts and zero volts signal which is fed to a retriggerable one-shot multivibrator 47 provided with a timer 48, realized as a NE 555 chip set to provide 37 millisecond timing pulses, so that the DATA is, in effect, looked at at certain times. The TTL output from the level shifter 46 is also fed as raw DATA to a microprocessor 51 which also receives a DATA active signal as its controlling input from the one-shot multivibrator 47 via a buffer 50. The microprocessor 51, which may include a 2K RAM for temporary storage, converts the TTL pulse train to an ASCII data set which is supplied to the central processor 40 (FIG. 4), under the control thereof, as are the outputs from the other processor channels (FIG. 4). In a preferred variant, the on-board microprocessor includes a 4K dual port RAM. The dual port RAM serves two purposes, (1) to hold decoding software for use by the microprocessor, and (2) to store decoded messages for collection by the central processor 40 (FIG. 4) for storage and transmission to the central host (FIG. 3). Each of the channels 37-39 (FIG. 4) includes a video presence detector 61, as shown in FIG. 5B, its output being connected to the microprocessor 51. The other features of the channel processor of FIG. 5B correspond to those shown in FIG. 5A. The video presence detector 61 is part of the circuitry (for those channels monitoring TV signals). This presence detector 61 is a self-contained module, added to the generic card design. The basic data decoding scheme remains unchanged, except that the output of the video detector presence detector 61 is either a logical ONE or a logical ZERO, with a logical ONE indicating that a fault, an absence of video during a program segment, was detected. The output of the video presence detector is preferably scanned only during commercial reception times; that is, when the on-board microprocessor 51 on the respective channel card detects an incoming commercial message, the processor 51 begins looking at the output of the video presence detector 61 module. If the message runs in its entirety with the video presence state a continuous ZERO, the system will report a successful video run, with no loss detected. If, during the commercial message duration, the processor detects a ONE, it will report a video hit. One can program the system to record time and duration of video loss. Therefore, the channels 37-39 can report audio and video losses to the central processor 40 independently. Moreover, channels 37-39 can report the presence and/or absence of video thereby allowing monitoring of both loss and presence of video or either one. In terms of usefulness, the absence of video would be the more significant parameter, requiring less storage capacity. It is to be understood that video presence and/or absence could be monitored for all program segments (after all advertizers are interested in whether the programs—in addition to commercial segments—have been received in their entirety). The microprocessor 51 under control of the central processor 40 (FIG. 4) carries out the routines respectively set out in flowchart form in FIG. 6A, and FIGS. 6B and 6C for radio and television station monitoring, respectively. In operation, the microprocessor 51 for each channel supplies in ASCII data set form for each program segment monitored a code sequence which consists of station ID, preamble code, program segment identification code, postamble code, dropout signal (if segment not received in its entirety), and day and time signals. In the case of the channels 37-39, two dropout signals may be developed. The first, as in the case of channels 34-36, is a signal indicative of an audio segment not being received in its entirety. The second signal developed is a signal indicative of a video segment not being received in its entirety.

As stated above, the central processor 40 supplies its output from RAM or diskette storage 41 via the modem 42 and a WATS line 30 to one of a plurality of MODEMS 57 at the central computer location 31 (FIG. 3). The modems 57 also receive inputs from other monitoring receiver stations, for example via WATS lines 52-56, supplying output therefrom to a reconciling minicomputer 60, which may be a VAX computer which is also provided in program segment data from the originator or originators thereof, as indicated by the block 58. The minicomputer 60 either simply compiles the received data or additionally reconciles it with the data from the originator(s).

The above described system can be used to carry out, in accordance with the present invention, a method of identification and verification of broadcasted program segments, the method comprising: providing program segments having a subaudible preamble code, respective subaudible identification codes and a subaudible postamble code; broadcasting the program segments from a plurality of broadcast stations; receiving at a monitoring location broadcasted signals, including the program segments, from the plurality of broadcast stations; deriving from the received broadcast signals the preamble code, the respective program segment identification codes and the postamble code; providing at the monitoring location respective broadcast station identification signals; generating at the monitoring location respective date-indicating and time-indicating signals; storing at the monitoring location signals representing occurrences of the preamble code, the respective program segment identification codes and the postamble code when received, each broadcast station identification signal from which each program segment was received each time it is received therefrom and the date-indicating and time-indicating signals each time a program segment is received; and sending the stored signals as data to a central point which also receives data from other monitoring locations for compilation and/or reconciliation.

In accordance with the present invention, the disclosed system can be used to carry out a method of identification and verification of broadcasted program segments, the method comprising: providing program segments having a subaudible preamble code, respective subaudible program segment identification codes and a subaudible postamble codes; broadcasting the program segments from a plurality of broadcast station, at least one of which is a television broadcast station, receiving at a monitoring location broadcasted signals, including the program segments, from a plurality of broadcast stations; deriving from the received broadcast signals the preamble code, the respective program segment identification codes and the postamble code and, in the case of broadcast signals from television stations, video presence and/or absence signals; providing at the monitoring location respective broadcast station identification signals; generating at the monitoring location respective date-indicating and time-indicating signals; storing at the monitoring location signals representing occurrences of the recovered preamble code, the respective program segment identification codes and the postamble code, when received, the video presence and/or absence signals, each broadcast station identification signal from which each program segment was received each time it is received therefrom and the date-indicating and time-indicating signals each time a program segment is received and absence of video presence signals during periods between respective preamble codes and respective postamble codes; and sending the stored signals as data to a central point which also receives data from other monitoring locations for compilation and/or reconciliation.

The system can also be used to carry out a method of identification and verification of broadcasted program segments, the method comprising: providing program segments having a subaudible preamble code, respective subaudible program segment identification codes and a subaudible postamble code; receiving at a monitoring location broadcasted signals, including the program segments, from the plurality of broadcast stations, including at least one television broadcast station; deriving from the received broadcast signals the preamble code, the respective program segment identification codes and the postamble code and, in the case of signals from television broadcast stations, video presence and/or absence signals at least during periods between the respective preamble codes and the respective postamble codes; providing at the monitoring station respective broadcast station identification signals; generating at the monitoring location respective date-indicating and time-indicating signals; and storing at the monitoring location as data signals representing occurrence of the preamble code, the respective program segment identification codes and the postamble code when received and, in the case of video, the video presence and/or absence signals, each broadcast station identification signal from which each program segment was received each time it is received therefrom and the date-indicating and time-indicating signals each time a program segment containing a commercial message is received.

The disclosed system can also carry out a method of identification and verification of broadcasted program segments, the method comprising: providing program segments having respective subaudible program segment identification codes; receiving at a monitoring location broadcasted signals, including the program segments, from the plurality of broadcast stations, including at least one television broadcast station; deriving from the received broadcast signals the respective program segment identification codes and video presence and/or absence signals; providing at the monitoring station respective broadcast station identification signals; generating at the monitoring location respective date-indicating and time-indicating signals; and storing at the monitoring location as data signals representing occurrence of the respective program segment identification codes when received and the video presence signals, each broadcast station identification signal from which each program segment was received each time it is received therefrom and the date-indicating and time-indicating signals each time a program segment is received.

Programs suitable for carrying out the present invention (apart from the video presence and/or absence features) are set out in the above-mentioned co-pending patent application Ser. No. 206,294, filed June 14, 1988. These programs could easily be expanded to adapt them to the video presence and/or absence features.

It is to be understood that the foregoing description and accompanying drawings relate to preferred embodiments set out by way of example, not by way of limitation. Numerous other embodiments and variants are possible without departing from the spirit and scope of the present invention, its scope being defined by the appended claims.

What is claimed is:

1. A system for identification and verification of broadcasted program segments, the system comprising:
    a plurality of broadcasting stations, including at least one television broadcasting station, for broadcasting signals which include program segments having a subaudible preamble code, respective subaudible program segment identification codes, following each preamble code occurrence, a subaudible postamble code following each program segment identification code occurrence and, in the case of television broadcast stations a video signal;
    at least one monitoring station for receiving the broadcasted signals, said monitoring station including (a) means for generating date-indicating and time-indicating signals, (b) respective channels responsive to the broadcasted signal from each respective broadcasting station for recovering each received preamble code, each received respective program segment identification code, each received postamble code and, for monitored television broadcast stations, each video signal to develop therefrom video presence and/or absence signals at least during periods between each received preamble code and each received postamble code, and (c) means for providing respective broadcast station-identification signals;
    means at the monitoring station for storing data signal representations of each recovered preamble code, recovered respective program segment identification codes, recovered postamble code, the developed video presence and/or absence signals, the date-indicating and time-indicating signals, and the station-identifying signals for each channel; and
    means at the monitoring station for sending the stored data signal representations to a central station, the central station being provided with means for receiving data from a plurality of monitoring station to compile and/or to reconcile same.

2. The system according to claim 1, wherein the plurality of broadcasting stations include standard radio broadcasting stations.

3. The system according to claim 2, wherein the standard radio broadcasting stations include frequency modulation broadcast stations and amplitude modulation broadcast stations.

4. The system according to claim 1, wherein at least some of the broadcast stations are those of a cable distribution network.

5. The system according to claim 1, wherein the subaudible program segment identification codes consist of respective series of alphanumeric characters.

6. The system according to claim 5, wherein the alphanumeric characters are formed by a series of mark signals and space signals, defined respectively by presence and absence of a 40 Hz. subaudible tone.

7. The system according to claim 5, wherein the subaudible preamble code consists of a predetermined number of cycles of 40 Hz. and wherein the subaudible postamble code consists of a given number of cycles of 40 Hz.

8. The system according to claim 1, wherein the subaudible preamble code consists of a predetermined number of cycles of 40 Hz. and wherein the subaudible postamble code consists of a given number of cycles of 40 Hz.

9. The system according to claim 1, wherein respective said program segment identification codes are repeated during periods of time between the preamble code and postamble code, whereby it may be determined if program segments have been transmitted in the entirety.

10. The system according to claim 1, wherein at least some of the program segments are commercial message segments.

11. In a system for identification and verification of broadcasted program segments from a plurality of broadcasting stations, including at least one television broadcasting station,
    at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering a subaudible preamble code, respective subaudible program segment identification codes, a subaudible postamble code, and, for monitored television broadcast stations, each video signal to develop therefrom a video presence and/or absence signals at least during periods between each received preamble code and each received postamble code, and (c) means for providing respective broadcast station-identification signals;
    means at the monitoring station for storing data signal representations of each recovered preamble code, recovered respective program identification codes and postamble code, the video presence and/or absence signals, the date-indicating and time-indicating signals, and the station-identifying signals for each channel; and means at the monitoring station for sending the stored data signal representations to a central station, the station being provided with means for receiving data from a plurality of monitoring stations to compile and/or to reconcile same.

12. The system according to claim 11, wherein the subaudible program segment identification codes consist of respective series of alphanumeric characters.

13. The system according to claim 12, wherein the alphanumeric characters are formed by a series of mark signals and space signals, defined respectively by presence and absence of a 40 Hz. subaudible tone.

14. The system according to claim 12, wherein the subaudible preamble code consists of a predetermined number of cycles of 40 Hz. and wherein the subaudible postamble code consists of a given number of cycles of 40 Hz.

15. The system according to claim 11, wherein the subaudible preamble code consists of a predetermined number of cycles of 40 Hz. and wherein the subaudible postamble code consists of a given number of cycles of 40 Hz.

16. The system according to claim 11, wherein respective said program segment identification codes are repeated during periods of time between the preamble code and postamble code, whereby it may be determined if program segments have been transmitted in the entirety.

17. The system according to claim 11, wherein at least some of the program segments are commercial message segments.

18. In a system for identification and verification of broadcasted program segments from a plurality of broadcasting stations, including at least one television broadcast station, at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering a subaudible preamble code, respective subaudible program segment identification codes of each program segment received therefrom and a subaudible postamble code and, for monitored television broadcast stations, each video signal to develop therefrom video presence and/or absence signals during periods between each received preamble code and each received postamble code, and (c) means for providing respective broadcast station-identification signals; and means at the monitoring station for storing data signal representations of each recovered preamble code, recovered program segment, postamble code, identification codes, the video presence and/or absence signals, the date-indicating and time-indicating signals, and the station-identifying signals for each channel.

19. The system according to claim 18, wherein the subaudible program segment identification codes consist of respective series of alphanumeric characters.

20. The system according to claim 19, wherein the alphanumeric characters are formed by a series of mark signals and space signals, defined respectively by presence and absence of a 40 Hz. subaudible tone.

21. The system according to claim 19, wherein the subaudible preamble code consists of a predetermined number of cycles of 40 Hz. and wherein the subaudible postamble code consists of a given number of cycles of 40 Hz.

22. The system according to claim 18, wherein the subaudible preamble code consists of a predetermined number of cycles of 40 Hz. and wherein the subaudible postamble code consists of a given number of cycles of 40 Hz.

23. The system according to claim 18, wherein respective said program segment identification codes are repeated during periods of time between the preamble code and postamble code, whereby it may be determined if program segments have been transmitted in the entirety.

24. The system according to claim 18, wherein at least some of the program segments are commercial message segments.

25. In a system for identification and verification of broadcasted program segments from a plurality of broadcasting stations, including at least one television broadcasting station, at least one monitoring station for receiving broadcasted signals from broadcasting stations, said monitoring station including (a) means for generating date-indicating and time-indicating signals, (b) respective channels responsive to respective broadcasted signals from respective broadcasting stations for recovering program segment identification codes consisting of respective series of alphanumeric characters therefrom and, in the case of television broadcast stations, video presence and/or absence signals, and (c) means for providing respective broadcast station-identification signals; and means at the monitoring station for storing data signal representations of the recovered program segment identification codes, the date-indicating and time-indicating signals, the video presence and/or absence signals, and the station-identifying signals for each channel.

26. The system according to claim 25, wherein the alphanumeric characters are formed by a series of mark signals and space signals, defined respectively by presence and absence of a 40 Hz. subaudible tone.

27. The system according to claim 26, wherein each of the respective series of alphanumeric characters consists of a respective series of four letters and four numerals.

28. The system according to claim 25, wherein each of the respective series of alphanumeric characters consists of a respective series of four letters and four numerals.

29. The system according to claim 25, wherein respective said program segment identification codes are repeated during periods of time between a preamble code and a postamble code, whereby it may be determined if program segments have been transmitted in the entirety.

30. The system according to claim 25, wherein at least some of the program segments are commercial message segments.

31. In a system for identification and verification of broadcasted program segments from a plurality of broadcasting stations, at least one of which is a television broadcast system;

at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering program segment identification codes therefrom consisting of respective series of alphanumeric characters and, in the case of television broadcast station, developing video presence and/or absence signals, each of the respective series of alphanumeric characters consisting of a respective series of four letters and four numerals, and (c) means for providing respective broadcast station-identification signals; and means at the monitoring station for storing data signal representations of the recovered program segment identification codes, the developed video presence and/or absence signals, the date-indicating and time-indicating signals, and the station-identifying signals for each channel.

32. In a system for identification and verification of broadcasted program segments from a plurality of broadcasting stations, at least one of which is a television broadcast station;

at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering a preamble code, program segment identification codes and a postamble code therefrom, respective said program segment identification codes being repeated during periods of time between the preamble code and the postamble code whereby it may be determined if the respective program segments have been transmitted in the entirety, and, in the case of television broadcast stations, developing video presence and/or absence signals and (c) means for providing respective broadcast station-identification signals; and means at the monitoring station for storing data signal representations of the recovered program segment identification codes, the developed video presence and/or absence signals, the date-indicating and time-indicating signals, and the station-identifying signals for each channel.

33. In a system for identification and verification of broadcasted program segments, at least some of the program segments being commercial message segments, from a plurality of broadcasting stations, including at least one television broadcast station;

at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering program segment identification codes therefrom, and, in the case of television broadcast signals, video presence and/or absence signals, and (c) means for providing respective broadcast station-identification signals; and means at the monitoring station for storing data signal representations of the recovered program segment identification codes, the video presence and/or absence signals, the date-indicating and time-indicating signals, and the station-identifying signals for each channel.

34. Method of identification and verification of broadcasted program segments, the method comprising:

providing program segments having a subaudible preamble code, respective subaudible program segment identification codes and a subaudible postamble code;

broadcasting the program segments from a plurality of broadcast stations, at least one of which is a television broadcast station;

receiving at a monitoring location broadcasted signals, including the program segments, from the plurality of broadcast stations;

deriving from the received broadcast signals the preamble code, the respective program segment identification codes and the postamble code and, in the case of broadcast signals from television broadcast stations, video presence and/or absence signals;

providing at the monitoring location respective broadcast station identification signals;

generating at the monitoring location respective date-indicating and time-indicating signals;

storing at the monitoring location signals representing the preamble code, the respective program segment identification codes, the postamble code when received and the video presence signals, each broadcast station identification signal from which each program segment was received each time, it is received therefrom, the date-indicating and time-indicating signals each time a program segment is received and the video presence and/or absence signals at least during periods between the respective preamble codes and respective postamble codes; and sending the stored signals as data to a central point which also receives data from other monitoring locations for compilation and/or reconciliation.

35. Method of identification and verification of broadcasted program segments, the method comprising:

providing program segments having a subaudible preamble code, respective subaudible program segment identification codes and a subaudible postamble code;

receiving at a monitoring location broadcasted signals, including the program segments, from a plurality of broadcast stations, including at least one television broadcast station;

deriving from the received broadcast signals the preamble code, the respective program segment identification codes, the postamble code and, in the case of signals from television broadcast stations, video presence and/or absence signals at least during periods between the respective preamble codes and the respective postamble codes;

providing at the monitoring location respective broadcast station identification signals;

generating at the monitoring location respective date-indicating and time-indicating signals;

storing at the monitoring location signals representing the recovered preamble code, the respective program segment identification codes and the postamble code, when received, the video presence and/or absence signals, each broadcast station identification signal from which each program segment was received each time it is received therefrom and the date-indicating and time-indicating signals each time a program segment is received; and sending the stored signals as data to a central point which also receives data from other monitoring locations for compilation and/or reconciliation.

36. Method of identification and verification of broadcasted program segments, the method comprising:

providing program segments having a subaudible preamble code, respective subaudible program segment identification codes and a subaudible postamble code;

receiving at a monitoring location broadcasted signals, including the program segments, from the plurality of broadcast stations, including at least one television broadcast station;

deriving from the received broadcast signals the preamble code, the respective program segment identification codes, the postamble code and, in the case of signals from television broadcast stations, video presence and/or absence signals at least during periods between occurrences of the preamble code and the postamble code;

providing at the monitoring station respective broadcast station identification signals;

generating at the monitoring location respective date-indicating and time-indicating signals; and storing at the monitoring location data signals representing the preamble code, the respective program segment identification codes, the postamble code when received and, in the case of video, the video presence and/or absence signals, each broadcast station identification signal from which each program segment was received each time it is received therefrom and the date-indicating and time-indicating signals each time a program segment containing a commercial message is received.

37. Method of identification and verification of broadcasted program segments, the method comprising:

providing program segments having respective subaudible program segment identification codes and a postamble code;

receiving at a monitoring location broadcasted signals, including the program segments, from a plurality of broadcast stations, including at least one television broadcast station;

deriving from the received broadcast signals the respective program segment identification codes, the postamble code and, in cases of broadcasted television program segments, video presence and/or absence signals;

providing at the monitoring station respective broadcast station identification signals;

generating at the monitoring location respective date-indicating and time-indicating signals; and storing at the monitoring location data signals representing the respective program segment identification codes when received and the video presence and/or absence signals, each broadcast station identification signal from which each program segment was received each time it is received therefrom and the date-indicating and time-indicating signals each time a program segment is received.

* * * * *